United States Patent [19]
Harnish

[11] Patent Number: 5,345,633
[45] Date of Patent: Sep. 13, 1994

[54] CUSHION WITH INTERNAL STORAGE POUCH

[76] Inventor: Robert Harnish, 52 S. Hilltop Dr., Churchville, Pa. 18966

[21] Appl. No.: 47,256

[22] Filed: Apr. 13, 1993

[51] Int. Cl.$^5$ ............................................. A47C 16/00
[52] U.S. Cl. ............................................ 5/639; 5/645; 5/640; 5/630; 297/397
[58] Field of Search ................. 297/397; 5/636, 640, 5/645, 931, 648, 630, 639

[56] References Cited

U.S. PATENT DOCUMENTS

| | | | |
|---|---|---|---|
| 247,823 | 10/1881 | Hiller | 5/636 |
| 2,962,731 | 12/1960 | Bounds | 5/639 |
| 3,195,953 | 7/1965 | Zacks | 297/397 |
| 4,116,310 | 9/1978 | Shields | 5/639 X |
| 4,616,639 | 10/1986 | Huber | 5/630 X |
| 5,154,477 | 10/1992 | Lacy | 297/357 |

FOREIGN PATENT DOCUMENTS 2194883  3/1988  United Kingdom .................... 5/640

Primary Examiner—Michael F. Trettel
Attorney, Agent, or Firm—Z. T. Wobensmith, III

[57] ABSTRACT

A cushion that can detachably secured to a seat back of an automotive or other vehicle by a pair of adjustable straps, which cushion can support the neck of a person while riding in the vehicle, and has an internal storage pouch with a closure. An auxiliary strap is provided which attaches to the adjustable straps to fasten the cushion to a person's waist if it is desired.

The cushion includes a body portion which is contoured to fit the neck, preferably filled with a resilient plastic foam, with an outer protective cover of vinyl, and which has a horizontal opening in the back with a zipper to provide selective access to the storage pouch. The auxiliary strap is attached to the adjustable straps to enable the cushion to fit the waists of different sizes of persons.

4 Claims, 1 Drawing Sheet

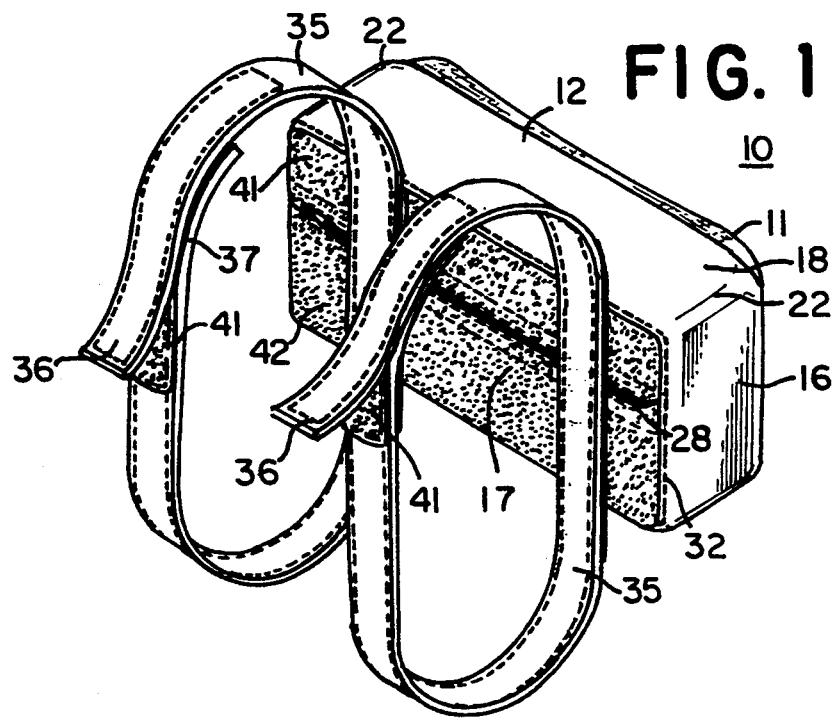
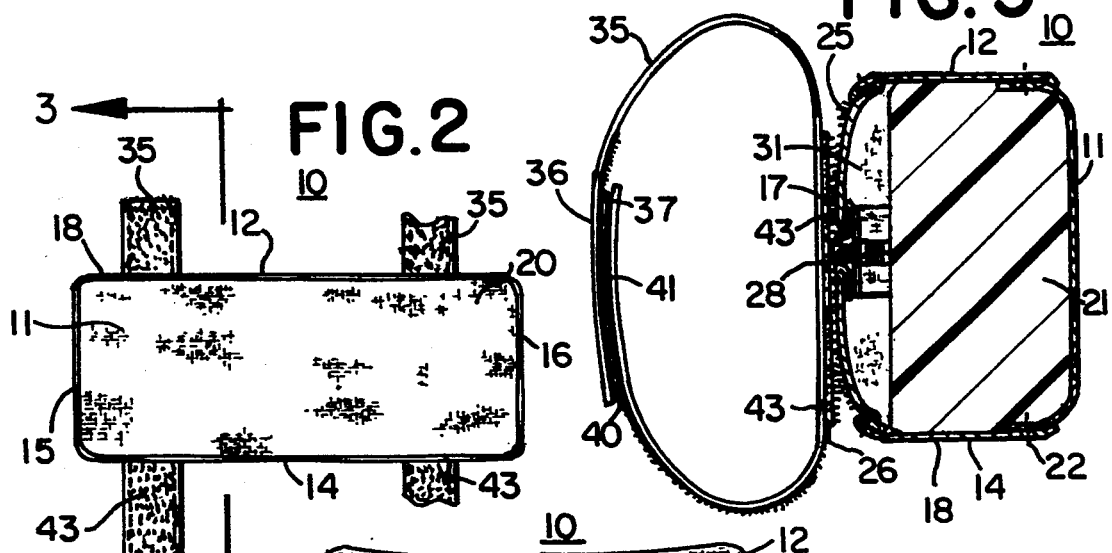
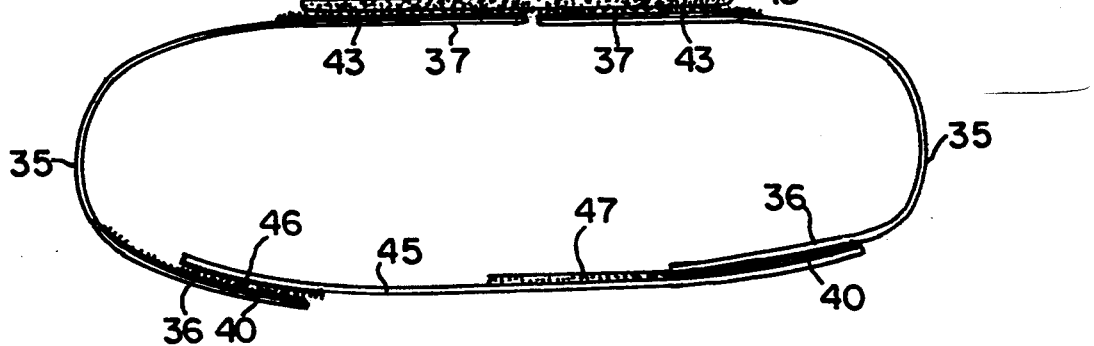

CUSHION WITH INTERNAL STORAGE POUCH

BACKGROUND OF THE INVENTION

1. Field of the Invention

This invention relates to a cushion of the support type that can be detachably fastened to a seat back, or to a person and is provided with a selectively accessible internal storage pouch.

2. Description of the Prior Art

The use of seats equipped with fixed or adjustable seat back head supports, or restraints has expanded as new standards and safety requirements have been imposed on automotive vehicle manufacturers.

Head restraints are intended to provide cushioning to the heads of drivers and passengers while riding in automotive vehicles, and particularly to provide protection from rear end collisions. Unfortunately existing head rest designs, both fixed and adjustable do not adequately support the riders necks' in normal operation or during accidents where the riders heads tend to rebound, the designs cause fatigue and tension and undesirable results from collisions.

It is desirable to have a cushion that can be easily attached to and detached from seat backs, which accommodates a variety of sizes or configurations of seat backs, can be used about the waist of a person, and has an internal storage pouch.

SUMMARY OF THE INVENTION

A cushion for use with the seat backs of automotive or other vehicles to support the necks of riders in the vehicles, or which can be attached to a persons' waist, and is provided at the rear with a selectively accessible internal pouch.

The principal object of the invention is to provide a detachable cushion which can be used with the seat backs of automotive vehicles to support the riders' necks.

A further object of the invention is to provide a cushion which has an adjustable fastening strap.

A further object of the invention is to provide a cushion which is simple and inexpensive to construct but sturdy and reliable in use.

A further object of the invention is to provide a cushion which has a selectively accessible internal pouch.

A further object of the invention is to provide a cushion that is contoured to reduce fatigue and to direct the users head and eyes forward.

A further object of the invention is to provide a cushion that can be used with a wide variety of seat backs.

A further object of the invention is to provide a cushion that can be worn about a persons waist.

Other object and advantageous features of the invention will be apparent from the description and claims.

DESCRIPTION OF THE DRAWINGS

The nature and characteristic features of the invention will be more readily understood from the following description taken in connection with the accompanying drawings forming part hereof in which;

FIG. 1 is a rear view in perspective of a cushion constructed in accordance with the invention;

FIG. 2 is a front elevational view of the cushion of FIG. 1;

FIG. 3 is a vertical sectional view taken approximately on the line 3—3 of FIG. 2; and FIG. 4 is a top plan view of the cushion illustrating it in condition to be attached to a persons' waist.

It should, of course, be understood that the description and drawings herein are merely illustrative, and that various modifications and changes can be made in the structure disclosed without departing from the spirit of the invention. Like numerals refer to like parts throughout the several views.

DESCRIPTION OF THE PREFERRED EMBODIMENT

Referring now more particularly to FIGS. 1–4, a preferred embodiment of the cushion 10 is therein illustrated.

The cushion 10 is of generally rectangular shape, with a front panel 11, top panel 12, bottom panel 14, right side panel 15, left side panel 16, and rear panel assembly 17.

The front panel 11 of cushion 10 is preferably contoured to fit the neck of the user (not shown) and to direct the users head and eyes forward. The front panel may be constructed of any suitable material such as velour fabric 20.

The cushion 10 is preferably filled with any suitable light weight resilient filling 21, with polyurethane foam being particularly suitable. The panels 12, 14, 15 and 16 are preferably constructed of a single piece of well known cloth covered vinyl material 18, and which surrounds the filling 21. The front panel 11 is preferably attached to the panels 12, 14, 15 and 16 by a line of stitches 22.

The rear panel assembly 17 is constructed of the same cloth covered vinyl material as are panels 12, 14, 15 and 16.

The rear panel assembly 17 is preferably attached to the panels 12, 14, 15 and 16 by a line of stitches 32.

The rear panel assembly 17 is of two piece construction, with an upper panel 25, and a lower panel 26, which are detachably connected by a zipper 28, of well known type, which extends horizontally across and to side panels 15 and 16, thereby permitting selective access to the interior of cushion 10.

The space between panels 25, 26 and foam filling 21, provides an internal pouch 31 accessible through zipper 28.

The divider panel 30 is also constructed of the same cloth covered vinyl material as panels 12, 14, 15 and 16, and is attached thereto by any suitable means such as a an internal line of stitching (not shown).

A pair of straps 35 are provided of the same vinyl materials as panels 11–14 with a strip of thistle cloth 40 on end 38, and a complimentary strip of thistle cloth 41 on strap end 39, to selectively retain the strap pieces 38 and 39 together and permit of adjustment to fit different size seat backs (not shown). The thistle cloth strips 40 and 41 are of any well known type and preferably of velcro.

The panels 25 and 26 are covered with strips 42 of thistle cloth which engage complimental strips of thistle cloth 43 on straps 35 for mounting of the cushion 10 to a seat back.

An additional strap 45 is provided, also of vinyl covered cloth, with strips of complimentary thistle cloth 46 and 47 thereon for engagement with the strips 40 on straps 35. The strap 45 can be used to fasten the cushion 10 about the waist of a user (not shown), or to fasten it for other uses as desired. It is thus apparent that structure has been described with which the objects of the invention are achieved.

I claim:

1. A cushion for supporting the neck of a person which can be detachably fastened to the seat back of an automotive or other vehicle which comprises
   a body portion
   said body portion having a front panel, a bottom panel, side panels, a top panel, a rear panel assembly,
   said front panel is contoured to fit the neck of a user and to direct his eyes and head forward,
   said body portion is filled with a resilient support material,
   a pair of straps having first thistle cloth means thereon,
   thistle cloth means carried by said cushion rear panel assembly for engagement with said strap first thistle cloth means,
   said straps each having selectively engagable complimentary strips of thistle cloth on their ends,
   said rear panel assembly has an upper panel and a lower panel,
   said upper and said lower panels are detachably joined by a zipper,
   whereby selectively accessible internal pouch means are provided.

2. A cushion as defined in claim 1 in which,
   said front panel is constructed of velour fabric.

3. A cushion as defined in claim 1 in which,
   said top panel, said side panel, said bottom panel and said rear panel assembly are constructed of vinyl covered fabric.

4. A cushion which can be carried about a persons waist which comprises a body portion,
   said body portion is filled with a resilient support material,
   at least one strap having thistle cloth means thereon,
   complimental thistle cloth means carried by said cushion
   said body portion having selectively accessible internal pouch means, and
   an auxiliary strap is provided having complimental strips of thistle cloth thereon which are selectively engageable with said straps to provide additional length thereto.

* * * * *